United States Patent Office 3,318,890
Patented May 9, 1967

3,318,890
4-(1-PIPERAZINYLAMINO) BUTYRIC ACID
ESTERS
Calvin H. Lovell, Morton Grove, Ill., assignor to G. D.
Searle & Co., Chicago, Ill., a corporation of Delaware
No Drawing. Filed Jan. 21, 1965, Ser. No. 427,130
5 Claims. (Cl. 260—268)

The present invention relates to a group of compounds which are piperazinylamino derivatives of butyric acid. More particularly, it relates to a group of compounds having the following general formula

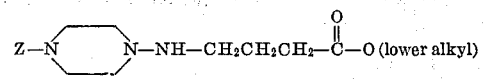

wherein Z is selected from the group consisting of

X, X—CH$_2$—, and X$_2$CH— wherein X is selected from the group consisting of phenyl, tolyl, halophenyl, and methoxyphenyl. The halophenyl radicals referred to above include fluorophenyl, chlorophenyl, bromophenyl, and iodophenyl. Lower alkyl in the above formula encompasses radicals containing up to 6 carbon atoms. Examples of such radicals are methyl, ethyl, propyl, isopropyl, and butyl. Depending on the value of Z, the compounds of this invention are N-phenyl, N-benzyl, or N-benzhydryl derivatives of piperazine.

Also encompassed by this invention are the non-toxic salts of the aforementioned organic bases, as exemplified by the hydrochloride, hydrobromide, hydroiodide, tartrate, succinate, maleate, malate, acetate, citrate, ascorbate, nitrate, sulfate, phosphate, and sulfamate. Such salts can contain one or more molecules of acid for each molecule of base.

The compounds of the present invention are conveniently prepared by the reductive alkylation of the appropriate aminopiperazine. That is, an aminopiperazine of the formula

wherein Z is defined as above is reacted with the appropriate ester of 3-formylpropionic acid and hydrogen under pressure to give the desired compound. The reaction is thus carried out conveniently in a single step although, obviously, a two-step process is also possible. That is, the N-aminopiperazine can be reacted with the carbonyl compound to give the corresponding hydrazone. The hydrazone can be isolated and then reduced to give the desired hydrazine. Platinum oxide is the preferred catalyst for the reduction step.

The N-aminopiperazines used as starting materials are either known compounds themselves or can be prepared by the procedures described in detail in my copending application, Ser. No. 408,729, filed Nov. 4, 1964, or my copending application, Ser. No. 387,765, filed Aug. 5, 1964, now U.S. Patent 3,200,120.

The compounds of this invention are useful because of their pharmacological properties. In particular, the compounds possess activity as pepsin inhibitors. In addition, they possess anti-biotic activity against a variety of organisms. Thus, they inhibit the growth of bacteria such as *Diplococcus pneumoniae*, algae such as *Chlorella vulgaris*, and protozoa such as *Tetrahymena gelleii*. They also inhibit germination of seeds of Trifolium. In addition, these compounds possess activity as anti-fertility agents.

The following examples are presented to further illustrate the present invention; they should not be construed as limiting it in spirit or in scope. In these examples, quantities are indicated in parts by weight and temperatures in degrees centigrade (° C.).

EXAMPLE 1

A solution of 15.6 parts of ethyl 3-formylpropionate, 26.7 parts of 1-amino-4-benzhydrylpiperazine, and 6 parts of glacial acetic acid in 120 parts of absolute ethanol is hydrogenated over platinum oxide at a pressure of 1675 pounds per square inch at a temperature of 27° C. for 5 hours. The resultant mixture is filtered and the filtrate is diluted with 500 parts of water. Excess potassium carbonate is added to the solution which is then extracted thoroughly with several portions of ether. The combined ether extracts are dried over potassium carbonate and then concentrated to give an oily residue. This is dissolved in hot 2-propanol and mixed with an excess of maleic acid. The solid which precipitates is separated and recrystallized from 2-propanol to give the dimaleate salt of ethyl 4-(4-benzhydryl-1-piperazinylamino)butyrate melting at about 119–121° C. The free base of this compound has the following formula

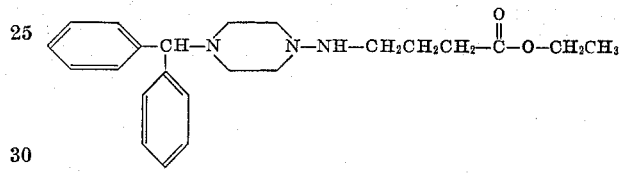

EXAMPLE 2

An equivalent quantity of methyl 3-formylpropionate is substituted for the ethyl 3-formylpropionate and the procedure described in Example 1 is repeated. The product thus obtained as the dimaleate salt is methyl 4-(4-benzhydryl-1-piperazinylamino)butyrate.

EXAMPLE 3

A solution of 30.1 parts of 1-amino-4-(4-chlorobenzhydryl)piperazine, 15.6 parts of ethyl 3-formylpropionate, and 6 parts of glacial acetic acid in 120 parts of absolute ethanol is hydrogenated over platinum oxide at a pressure of 1600 pounds per square inch and a temperature of 25° C. for 7 hours. The resultant mixture is filtered and diluted with 1000 parts of water. Excess potassium carbonate is added to the solution to give an alkaline mixture which is then extracted with several portions of ether. The combined ether solutions are then extracted with an excess of 1 N hydrochloric acid and the acid extract is made alkaline. This alkaline solution is extracted with ether and the ether solution is dried over potassium carbonate. The solvent is evaporated and the residue is dissolved in hot 2-propanol and mixed with an excess of maleic acid. The solid which precipitates is separated and recrystallized from absolute ethanol to give the dimaleate salt of ethyl 4-[4-(4-chlorobenzhydryl)-1-piperazinylamino]butyrate melting at about 100–103° C.

If an equivalent quantity of 1-amino-4-(2-chlorobenzhydryl)piperazine is substituted for the 1 - amino-4-(4-chlorobenzhydryl)piperazine and the procedure in the above paragraph is repeated, the product obtained, as the dimaleate salt, is ethyl 4-[4-(2-chlorobenzhydryl) - 1- piperazinylamino]butyrate.

EXAMPLE 4

38.2 parts of 1-amino-4-benzylpiperazine is reacted with 32.5 parts of ethyl 3-formylpropionate in the presence of 12 parts of acetic acid according to the procedure described in Example 3. The maleate salt is prepared as before and recrystallized from absolute ethanol to give the dimaleate salt of ethyl 4-(4 - benzyl-1-piperazinyl-amino)butyrate melting at about 148–150° C. The free base of this compound has the following formula

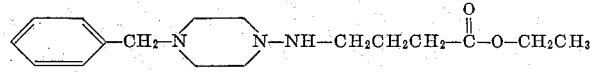

EXAMPLE 5

The procedure of Example 3 is repeated using 44.3 parts of 1-amino-4-(4 - methoxybenzyl)piperazine, 32.5 parts of ethyl 3-formylpropionate and 12 parts of acetic acid. The crude free base obtained is converted to the dimaleate salt which is recrystallized from absolute ethanol. The product thus obtained is the dimaleate salt of ethyl 4-[4-(4-methoxybenzyl) - 1 - piperazinylamino] butyrate melting at about 145–148° C.

In a similar way, 1- amino-4-(3-methylbenzyl)piperazine is reacted with ethyl 3-formylpropionate to give ethyl 4-[4-(3-methylbenzyl)-1-piperazinylamino]butyrate as the salt with 2 moles of maleic acid.

EXAMPLE 6

25.4 parts of 1-amino-34-phenylpiperazine is reacted with 32.5 parts of ethyl 3-formylpropionate in the presence of 12 parts of glacial acetic acid according to the procedure described in Example 3. The crude base is isolated and reacted with maleic acid to give the monomaleate of ethyl 4-(4-phenyl-1-piperazinylamio)butyrate. After crystallization from absolute ethanol, this product melts at about 137–140° C. The free base of this compound has the following formula

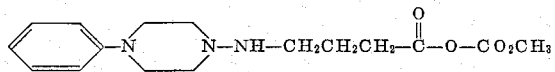

What is claimed is:
1. A compound of the formula

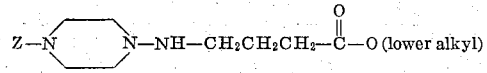

wherein Z is selected from the group consisting of $$X, X-CH_2-, \text{ and } X_2CH-$$

wherein X is selected from the group consisting of phenyl, tolyl, halophenyl, and methoxyphenyl.

2. A compound of the formula

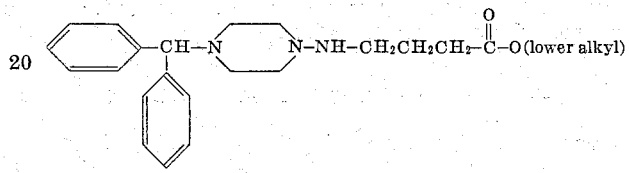

3. Ethyl 4-(4-benzhydryl-1-piperazinylamino)butyrate.
4. Ethyl 4-(4-benzyl-1-piperazinylamino)butyrate.
5. Ethyl 4-(4-phenyl-1-piperazinylamino)butyrate.

No references cited.

ALEX MAZEL, *Primary Examiner.*

HENRY R. JILES, *Examiner.*

UNITED STATES PATENT OFFICE
CERTIFICATE OF CORRECTION

Patent No. 3,318,890                                             May 9, 1967

Calvin H. Lovell

It is hereby certified that error appears in the above numbered patent requiring correction and that the said Letters Patent should read as corrected below.

Column 3, line 26, for "-34-" read -- -4- --; column 4, lines 3 to 5, the formula should appear as shown below instead of as in the patent:

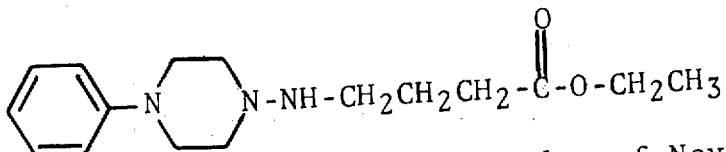

Signed and sealed this 21st day of November 1967.

(SEAL)
Attest:

EDWARD M. FLETCHER, JR.
Attesting Officer

EDWARD J. BRENNER
Commissioner of Patents